US009444963B2

(12) United States Patent
Watase

(10) Patent No.: US 9,444,963 B2
(45) Date of Patent: Sep. 13, 2016

(54) NON-TRANSITORY STORAGE MEDIUM STORING PRINTER DRIVER USED BY APPLICATION SOFTWARE THAT GENERATES PRINT SCRIPT FROM ORIGINAL IN ACCORDANCE WITH ABILITY OF IMAGE FORMING APPARATUS, AND PRINTING METHOD

(71) Applicant: KYOCERA Document Solutions Inc., Osaka (JP)

(72) Inventor: Shinichiro Watase, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/883,019

(22) Filed: Oct. 14, 2015

(65) Prior Publication Data
US 2016/0112594 A1    Apr. 21, 2016

(30) Foreign Application Priority Data

Oct. 21, 2014   (JP) ................................ 2014-214890

(51) Int. Cl.
*H04N 1/00*     (2006.01)
*H04N 1/32*     (2006.01)
*H04N 1/393*    (2006.01)

(52) U.S. Cl.
CPC ...... *H04N 1/00938* (2013.01); *H04N 1/00244* (2013.01); *H04N 1/00482* (2013.01); *H04N 1/32122* (2013.01); *H04N 1/3935* (2013.01); *H04N 2201/0094* (2013.01)

(58) Field of Classification Search
CPC .................... H04N 1/00938; H04N 1/00482; H04N 1/32122; H04N 1/3935; H04N 2201/0094
USPC .................................................. 358/1.2, 1.15
See application file for complete search history.

(56) References Cited

U.S. PATENT DOCUMENTS 5,745,659 A  *  4/1998  Rigau Rigau .......... G06K 15/00
                                                            358/1.1

FOREIGN PATENT DOCUMENTS

JP          2005-301888 A     10/2005

* cited by examiner

*Primary Examiner* — Jamares Q Washington
(74) *Attorney, Agent, or Firm* — Stein IP, LLC

(57) ABSTRACT

Provided is a non-transitory storage medium storing a printer driver and a printing method, which enable to improve print quality even if an original is extremely reduced for printing. A computer, which executes the printer driver to be used by application software for generating a print script to be printed by an MFP from the original in accordance with ability of the MFP, obtains a scale factor on the basis of a size of a recording medium to be printed by the MFP and a size of the original (S133), multiplying the scale factor obtained in S133 by an actual print resolution of the MFP so as to obtain a resolution to reply (S134), and reply the resolution to reply obtained in S134 to the application software in response to an inquiry about the ability from the application software (S135).

4 Claims, 12 Drawing Sheets

NON-TRANSITORY STORAGE MEDIUM STORING PRINTER DRIVER USED BY APPLICATION SOFTWARE THAT GENERATES PRINT SCRIPT FROM ORIGINAL IN ACCORDANCE WITH ABILITY OF IMAGE FORMING APPARATUS, AND PRINTING METHOD

INCORPORATION BY REFERENCE

This application is based upon and claims the benefit of priority from the corresponding Japanese Patent Application No. 2014-214890 Oct. 21, 2014, the entire contents of which are incorporated herein by reference.

BACKGROUND

The present disclosure relates to a non-transitory storage medium storing a printer driver that is used by application software for generating a print script to be printed by an image forming apparatus from an original in accordance with ability of the image forming apparatus, and relates to a printing method.

Conventionally, there is known a printer driver that reduces a print resolution to be replied to the application software when printing is performed on a large-size, i.e., A2 size or larger size of recording medium, in order to prevent overflow of a coordinate value or the like of the original.

According to the conventional printer driver, it is possible to print on a large-size recording medium while preventing overflow of a coordinate value or the like of an original.

However, when an original generated in accordance with a large-size recording medium is printed by an ordinary image forming apparatus that cannot print on a large-size recording medium, there occurs the following problem. As a print script is generated from the original by an application in accordance with an actual print resolution of the image forming apparatus, namely, as rendering is performed, when the image forming apparatus performs reduced printing based on the print script, a fine part such as a thin line or halftone dot meshing in the print script is collapsed in the printed result.

For instance, consider a case where an original generated in accordance with a large-size recording medium is printed by an ordinary image forming apparatus. FIG. 12A shows a partial region 91 of a print script generated from an original by an application in accordance with an actual print resolution of the image forming apparatus. The region 91 shown in FIG. 12A has 9×9 pixels including filled pixels 91a and unfilled pixels 91b. The total number of pixels in the region 91 is 81, while the number of pixels 91a in the region 91 is 45. Accordingly, a filled pixel ratio of the region 91 is 5/9. When the image forming apparatus performs printing on the basis of the print script generated by the application, because the number of pixels of the print script generated by the application is too large, the image forming apparatus performs reduced printing. For instance, supposing that 1/3 reduced printing is performed, the region 91 shown in FIG. 12A is printed as a region 92 shown in FIG. 12B, for example. The region 92 shown in FIG. 12B has 3×3 pixels including only filled pixels 92a. In other words, the pattern of the region 91 is collapsed to be the region 92 due to thinning of pixels in the reduced printing.

SUMMARY

A non-transitory storage medium according to the present disclosure stores a printer driver to be used by application software for generating a print script to be printed by an image forming apparatus from an original in accordance with ability of the image forming apparatus. The printer driver enables the computer to function as an ability reply device configured to reply the ability to the application software in response to an inquiry asking the ability from the application software. The ability reply device obtains a resolution to reply as a print resolution included in the ability to reply to the application software, by obtaining a scale factor of the resolution to reply to an actual print resolution of the image forming apparatus on the basis of a size of a recording medium to be printed by the image forming apparatus and a size of the original, and by multiplying the obtained scale factor by the actual print resolution of the image forming apparatus.

A printing method according to the present disclosure includes the steps of obtaining a scale factor of a resolution to reply to an actual print resolution of an image forming apparatus on the basis of a size of a recording medium to be printed by the image forming apparatus and a size of an original, multiplying the obtained scale factor by the actual print resolution of the image forming apparatus so as to obtain the resolution to reply, and performing printing on the basis of the resolution to reply.

DETAILED DESCRIPTION

Now, an embodiment of the present disclosure is described with reference to the drawings.

First, a structure of a print system according to this embodiment is described.

Figure 1:
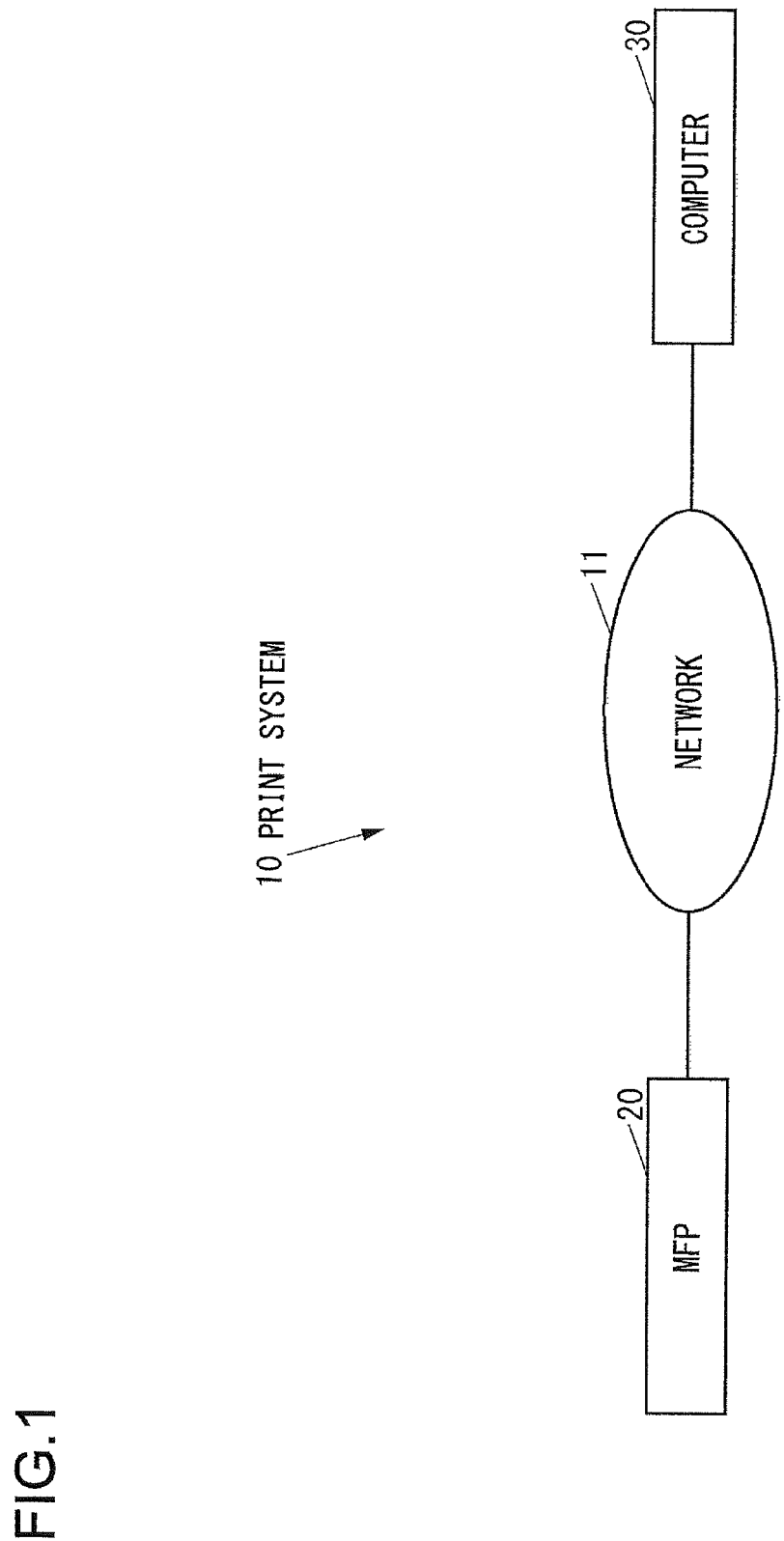
FIG. 1 is a schematic diagram illustrating a print system according to an embodiment of the present disclosure.

FIG. 1 is a schematic diagram illustrating a print system 10 according to this embodiment.

As shown in FIG. 1, the print system 10 includes a multifunction peripheral (MFP) 20 as an image forming apparatus, and a computer 30 for transmitting print data to be printed by the MFP 20 to the MFP 20. The MFP 20 and the computer 30 are connected in a communicable manner via a network 11 such as a local area network (LAN) or the Internet.

Figure 2:
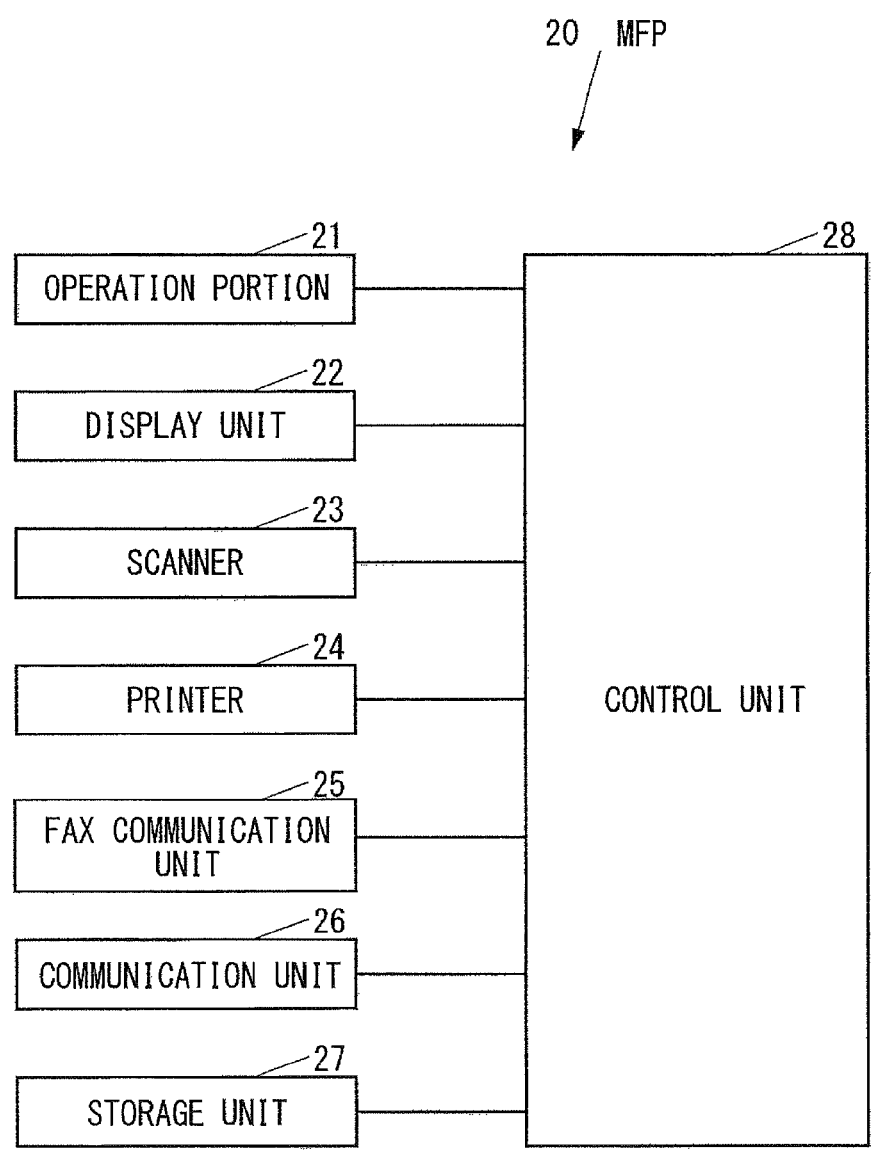
FIG. 2 is a schematic block diagram illustrating a block configuration of a multifunction peripheral (MFP) shown in FIG. 1.

FIG. 2 is a schematic block diagram illustrating a block configuration of the MFP 20.

As shown in FIG. 2, the MFP 20 includes an operation portion 21 as an input device such as buttons with which various operations are input, a display unit 22 as a display device such as a liquid crystal display (LCD) for displaying various information, a scanner 23 as a reading device for reading images, a printer 24 as a print device for printing on a recording medium such as a paper sheet, a FAX communication unit 25 as a facsimile device for performing facsimile communication with an external facsimile device (not shown) via a communication line such as a public telephone line, a communication unit 26 as a communication device for performing communication with an external device such as the computer 30 (see FIG. 1) via the network 11 (see FIG. 1), an electrically erasable programmable read only memory (EEPROM) for storing various data, a storage unit 27 as a storage device such as a hard disk drive (HDD), and a control unit 28 for controlling the entire of the MFP 20.

The control unit 28 includes, for example, a central processing unit (CPU), a read only memory (ROM) for storing a program and various data, and a random access memory (RAM) that is used as a working area of the CPU. The CPU executes a program stored in the ROM or the storage unit 27.

Figure 3:
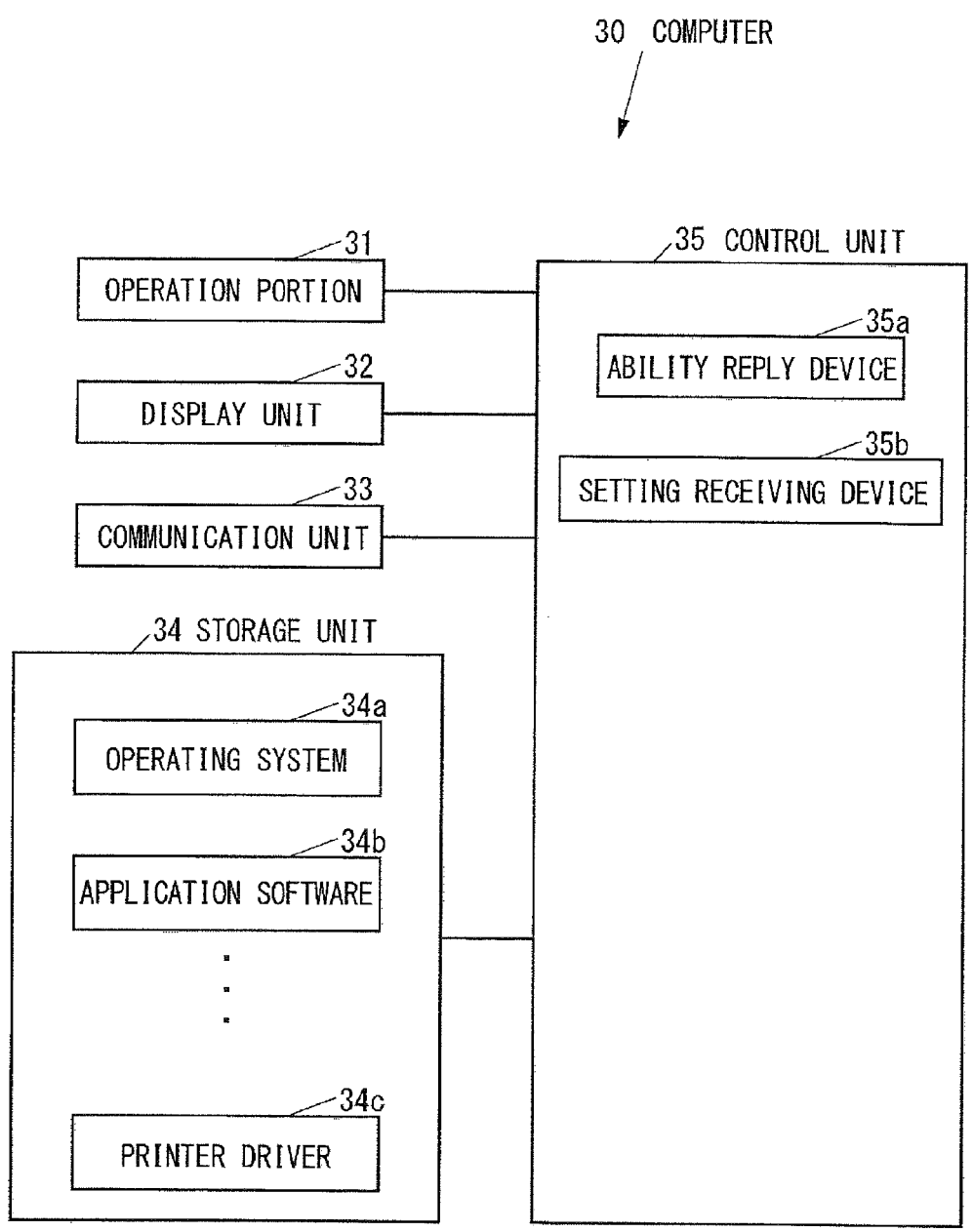
FIG. 3 is a schematic block diagram illustrating a block configuration of a computer shown in FIG. 1.

FIG. 3 is a schematic block diagram illustrating a block configuration of the computer 30.

As shown in FIG. 3, the computer 30 includes an operation portion 31 as an input device such as a mouse and a keyboard for inputting various operations, a display unit 32 as a display device such as an LCD for displaying various information, a communication unit 33 as a communication device for performing communication with an external device such as the MFP 20 (see FIG. 1) via the network 11 (see FIG. 1), a storage unit 34 as a storage device such as the HDD for storing a program and various data, and a control unit 35 for controlling the entire of the computer 30. The computer 30 is electronic equipment such as a personal computer (PC) or portable equipment.

The storage unit 34 stores an operating system 34a, a plurality of application software 34b working on the operating system 34a, and a printer driver 34c for controlling the MFP 20. The operating system 34a, the application software 34b, and the printer driver 34c may be installed in the computer 30 when the computer 30 is manufactured, or may be additionally installed into the computer 30 from a storage medium such as a compact disk (CD), a digital versatile disk (DVD), or a USB memory, or may be additionally installed into the computer 30 via the network 11.

The application software 34b is software for generating a print script to be printed by the MFP 20 from an original in accordance with ability of the MFP 20.

The printer driver 34c is software to be used by the application software 34b. Accordingly, the computer 30 of the present disclosure is configured to include a non-transitory computer readable storage medium storing the printer driver 34c.

The control unit 35 includes, for example, a CPU, a ROM storing a program and various data in advance, and a RAM to be used as a working area for the CPU. The CPU executes the program stored in the ROM or the storage unit 34.

The control unit 35 functions as an ability reply device 35a that uses the printer driver 34c stored in the storage unit 34 so as to reply the ability of the MFP 20 to the application software 34b in response to an inquiry about the ability of the MFP 20 from the application software 34b, and functions as a setting receiving device 35b that receives a setting whether or not a resolution to reply as a print resolution included in the ability of the MFP 20 to be replied to the application software 34b by the ability reply device 35a is an actual print resolution of the MFP 20.

Next, an operation of the print system 10 (a printing method) is described.

Figure 4:
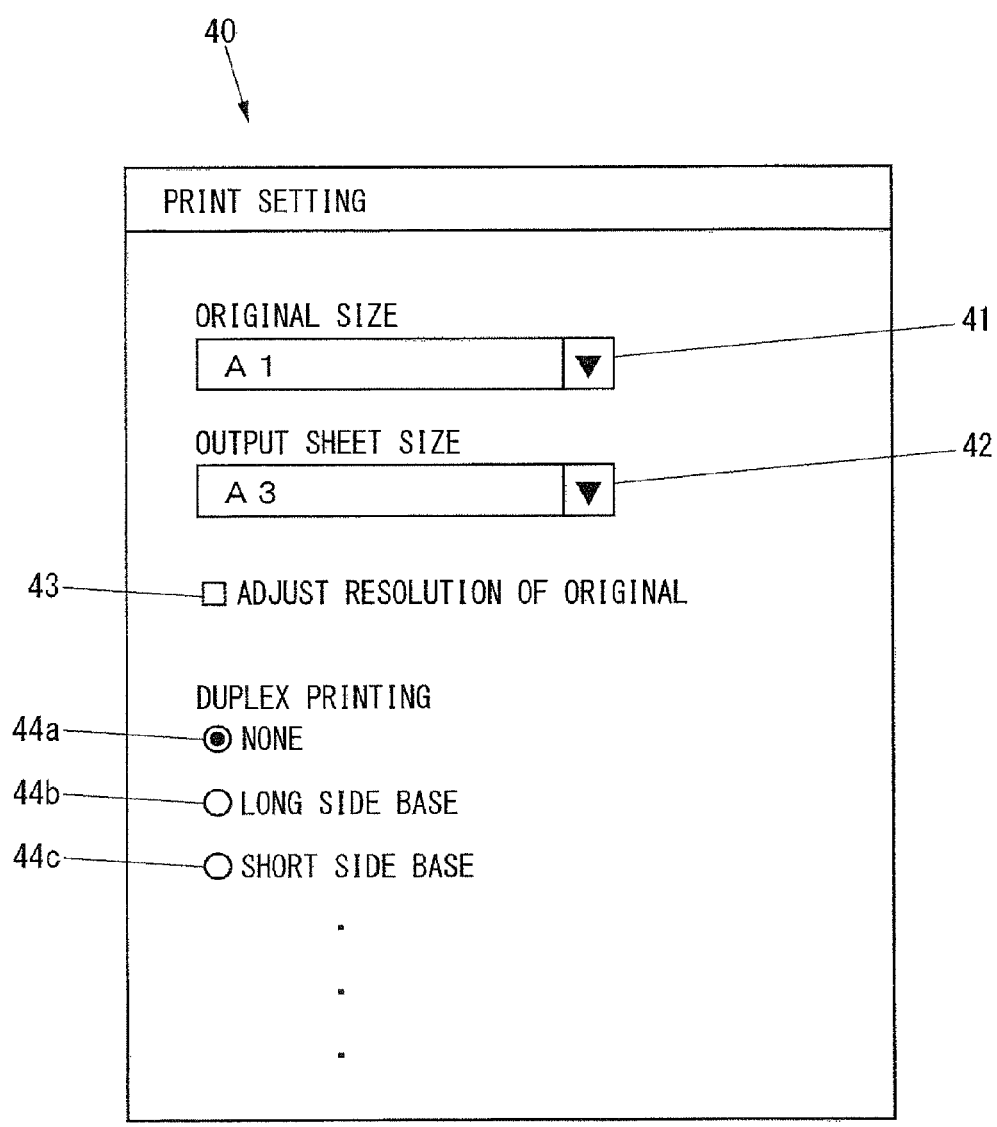
FIG. 4 is a schematic diagram illustrating an example of a dialog box displayed on a display unit shown in FIG. 3.

When a user instructs the computer 30 to start setting of printing in the printer driver 34c via the operation portion 31 of the computer 30, the setting receiving device 35b of the control unit 35 controls the display unit 32 to display a dialog box 40 shown in FIG. 4.

The dialog box 40 includes a drop-down list 41 for setting a size of the original (hereinafter referred to as an "original size"), a drop-down list 42 for setting a size of a recording medium to be printed by the MFP 20 (hereinafter referred to as an "output sheet size"), a check box 43 for setting whether or not to adjust resolution of the original, a radio button 44a for setting not to perform duplex printing, a radio button 44b for setting to perform duplex printing with respect to the long side of the recording medium, and a radio button 44c for setting to perform duplex printing with respect to the short side of the recording medium.

Only one of the radio buttons 44a, 44b and 44c is always selected.

As to the dialog box 40, a print setting other than those described above may be made.

When various settings are made in the dialog box 40 with the operation portion 31, the setting receiving device 35b receives the various settings made in the dialog box 40.

Figure 5:
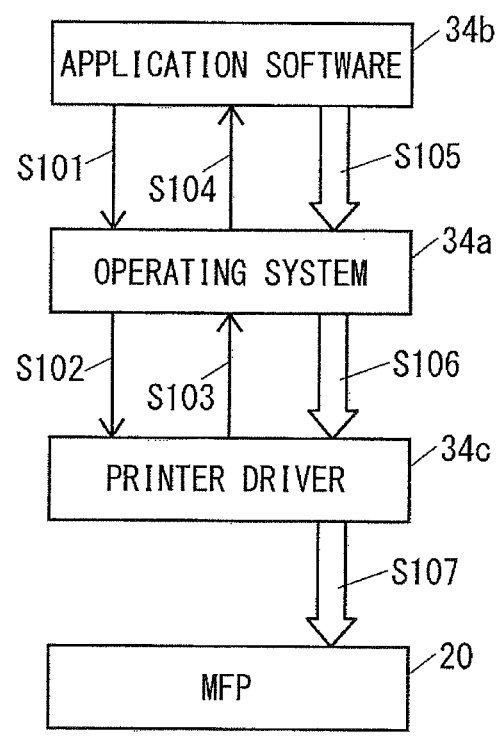
FIG. 5 is a schematic diagram illustrating an outline of an operation of the print system shown in FIG. 1.

FIG. 5 is a schematic diagram illustrating an outline of an operation of the print system 10 (printing method).

As shown in FIG. 5, the application software 34b inquires of the operating system 34a about ability of the MFP 20 (S101). Here, the ability of the MFP 20 means, for example, a size of a print region, a print resolution, and the like.

When the operating system 34a is inquired by the application software 34b about the ability of the MFP 20, the operating system 34a inquires of the printer driver 34c about the ability of the MFP 20 (S102).

When receiving the inquiry about the ability of the MFP 20 from the operating system 34a, the ability reply device 35a of the printer driver 34c replies the ability of the MFP 20 to the operating system 34a (S103).

When receiving the reply from the printer driver 34c about the ability of the MFP 20, the operating system 34a replies the ability of the MFP 20 replied from the printer driver 34c to the application software 34b (S104).

When receiving the ability of the MFP 20 replied from the operating system 34a, the application software 34b generates the print script from the original in accordance with the ability of the MFP 20 replied from operating system 34a, namely, performs rendering, and sends an instruction to draw the generated print script to the operating system 34a (S105).

When receiving the instruction to draw from the application software 34b, the operating system 34a sends the instruction to draw from the application software 34b to the printer driver 34c (S106).

When receiving the instruction to draw from the operating system 34a, the printer driver 34c translates the instruction to draw from the operating system 34a into a page description language (PDL), and transmits the translated PDL print data to the MFP 20 via the communication unit 33 (S107).

Hereinafter, the process of S103 is described in detail.

Figure 6:
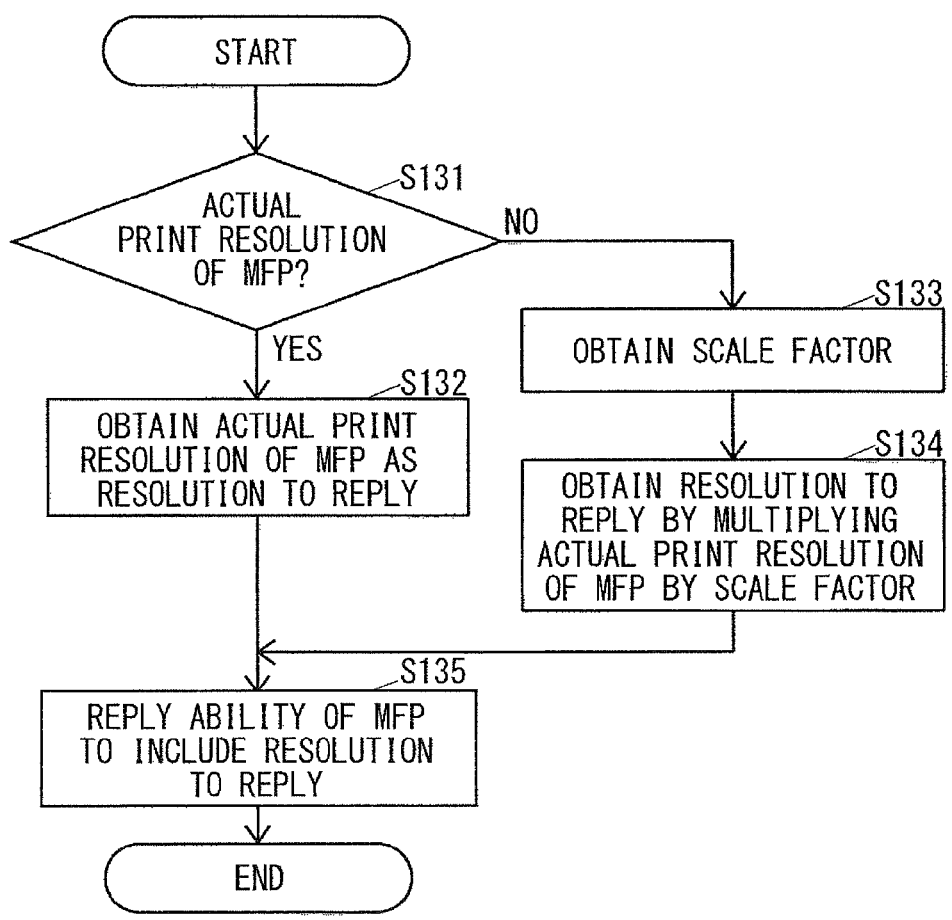
FIG. 6 is a flowchart of a process of a part of the operation shown in FIG. 5.

FIG. 6 is a flowchart of the process of S103.

As shown in FIG. 6, the ability reply device 35a determines whether or not the setting that the resolution to reply is the actual print resolution of the MFP 20 is accepted by the setting receiving device 35b (S131). Here, when the setting not to adjust resolution of the original is made in the check box 43, it means that the setting that the resolution to reply is the actual print resolution of the MFP 20 is accepted by the setting receiving device 35b. On the contrary, when the setting that to adjust resolution of the original is made in the check box 43, it means that the setting that the resolution to reply is not the actual print resolution of the MFP 20 is accepted by the setting receiving device 35b.

When the ability reply device 35a determines in S131 that the setting that the resolution to reply is the actual print resolution of the MFP 20 is accepted, the ability reply device 35a obtains the actual print resolution of the MFP 20 such as 600 dpi as the resolution to reply (S132).

When the ability reply device 35a determines in S131 that the setting that the resolution to reply is the actual print resolution of the MFP 20 is not accepted, the ability reply device 35a obtains a scale factor of the resolution to reply to the actual print resolution of the MFP 20 based on the output sheet size and the original size designated in the dialog box 40 and accepted by the setting receiving device 35b (S133).

Specifically, supposing that sizes in horizontal and vertical directions of the original size are W1 and H1, respectively, sizes in horizontal and vertical directions of the output sheet size are W2 and H2, respectively, and a width of a non-printable region existing in a periphery of the recording medium in the MFP 20 is d, then the ability reply device 35a determines a horizontal scale factor Rw and a vertical scale factor Rh from the following equation. Further, the ability reply device 35a obtains a smaller one of the determined Rw and Rh as the scale factor of the resolution to reply to the actual print resolution of the MFP 20. Note that the following equation is based on assumption that the non-printable regions in upper, lower, right, and left sides of the recording medium have the same width.

$$Rw = (W2 - d \times 2)/(W1 - d \times 2)$$

$$Rh = (H2 - d \times 2)/(H1 - d \times 2)$$

Hereinafter, description is added with reference to specific figures.

It is supposed that the original size is an A1 size, namely, W1 and H1 are 594 mm and 841 mm, respectively, the output sheet size is A3 size, namely, W2 and H2 are 297 mm and 420 mm, respectively, and the width d is 5 mm.

A printable region size in the original size is (W1−d×2), namely, 584 mm as a horizontal size and (H1−d×2), namely, 831 mm as a vertical size. In addition, a printable region size in the output sheet size is (W2−d×2), namely, 287 mm as a horizontal size and (H2−d×2), namely, 410 mm as a vertical size.

Figure 7:
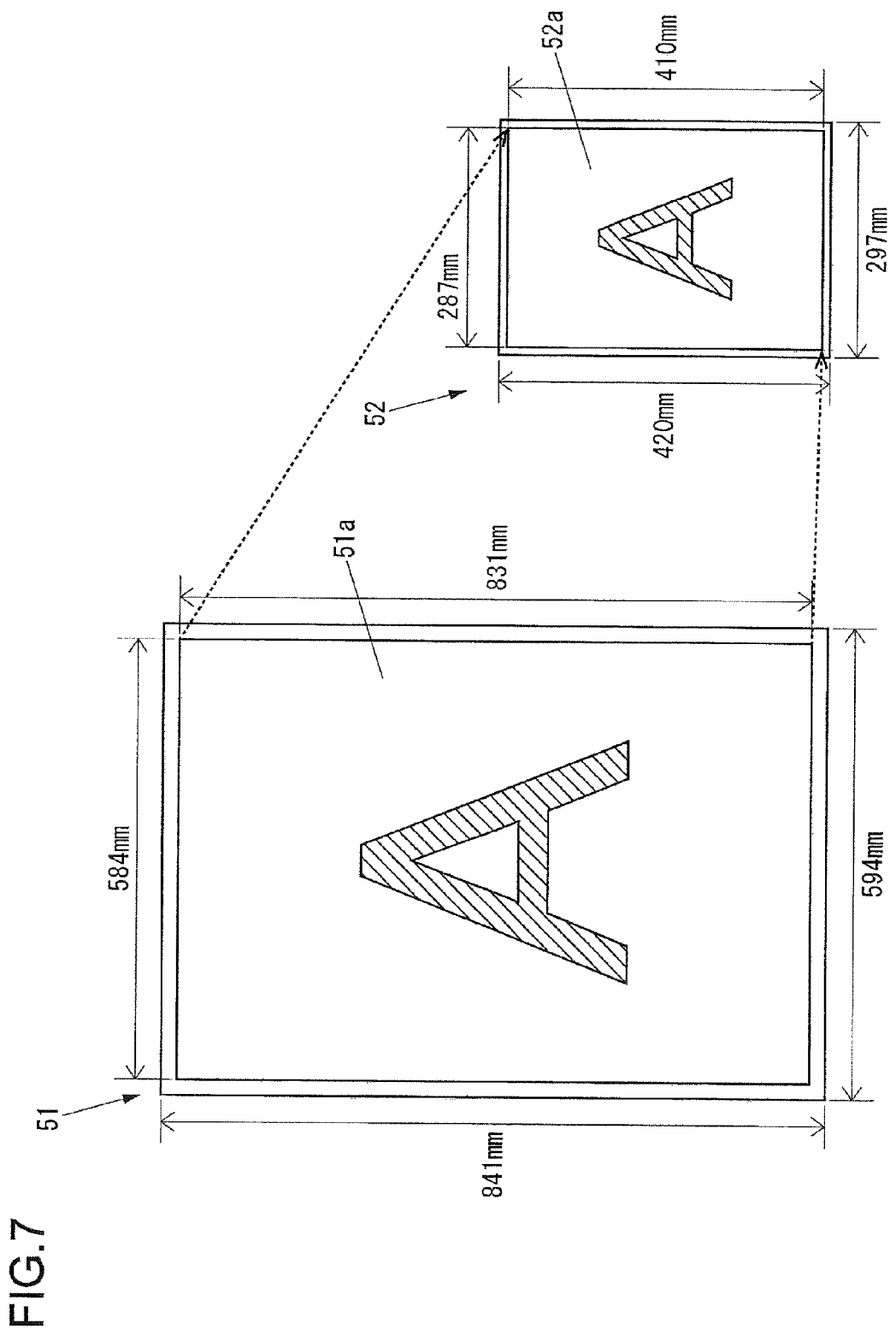
FIG. 7 is a schematic diagram illustrating an example of an original and a recording medium on which an image based on the original is printed by the MFP shown in FIG. 2.

Accordingly, as shown in FIG. 7, a printable region 51a of 584×831 mm in an original 51 of 594×841 mm should be printed in a printable region 52a of 287×410 mm in a recording medium 52 of 297×420 mm. As a result, the horizontal scale factor Rw is 287 mm/584 mm, namely, 49.14%, and the vertical scale factor Rh is 410 mm/831 mm, namely, 49.33%. Further, in order that an aspect ratio of the image is not changed between before and after the scale factor is changed, a smaller one of 49.14% and 49.33%, namely, 49.14% is obtained as the final scale factor.

As shown in FIG. 6, after the process of S133, the ability reply device 35a obtains the resolution to reply by multiplying the actual print resolution of the MFP 20 by the scale factor obtained in S133 (S134).

Specifically, when the actual print resolution of the MFP 20 is P and the scale factor obtained in S133 is R, the ability reply device 35a obtains the resolution to reply Rp from the following equation.

$$Rp = P \times R$$

Hereinafter, description is added with reference to specific figures.

When the print resolution P is 600 dpi and the scale factor R is 49.14%, the resolution to reply Rp is 600 dpi×0.4914, namely, 294.84 dpi.

After the process of S132 or S134, the ability reply device 35a replies the ability of the MFP 20 to include the resolution to reply obtained in S132 or S134 (S135), and finishes the operation shown in FIG. 6.

Hereinafter, generation of the print script in the process of S105 is described in detail.

In the case where the application software 34b generates the print script in accordance with the resolution to reply obtained in S132, when the resolution to reply obtained in S132 is 600 dpi, for example, the application software 34b calculates the number of pixels existing in the printable region 51a of 584×831 mm as follows. The number of pixels in the horizontal direction is 584 mm/25.4×600 dpi, namely, 13795 pixels, and the number of pixels in the vertical direction is 831 mm/25.4×600 dpi, namely, 19629 pixels. Accordingly, as shown in FIG. 8A, the application software 34b performs drawing in assumption that 13795×19629 pixels exist in the printable region 51a.

On the other hand, in the case where the application software 34b generates the print script in accordance with the resolution to reply obtained in S134, when the resolution to reply obtained in S134 is 294.84 dpi, for example, the application software 34b calculates the number of pixels existing in the printable region 51a of 584×831 mm as follows. The number of pixels in the horizontal direction is 584 mm/25.4×294.84 dpi, namely, 6778 pixels, and the number of pixels in the vertical direction is 831 mm/25.4×294.84 dpi, namely, 9646 pixels. Accordingly, as shown in FIG. 8B, the application software 34b performs drawing in assumption that 6778×9646 pixels exist in the printable region 51a.

Further, when the print resolution of the MFP 20 is 600 dpi, the number of pixels in the printable region 52a of 287×410 mm in the recording medium 52 of 297×420 mm, which is actually printed by the MFP 20, is calculated as follows. The number of pixels in the horizontal direction is 287 mm/25.4×600 dpi, namely, 6779 pixels, and the number of pixels in the vertical direction is 410 mm/25.4×600 dpi, namely, 9685 pixels. In other words, the control unit 28 of the MFP 20 controls the printer 24 to print in assumption that 6779×9685 pixels exist in the printable region 52a as shown in FIG. 9 on the basis of the print data received from the printer driver 34c in S107.

Figure 8A:
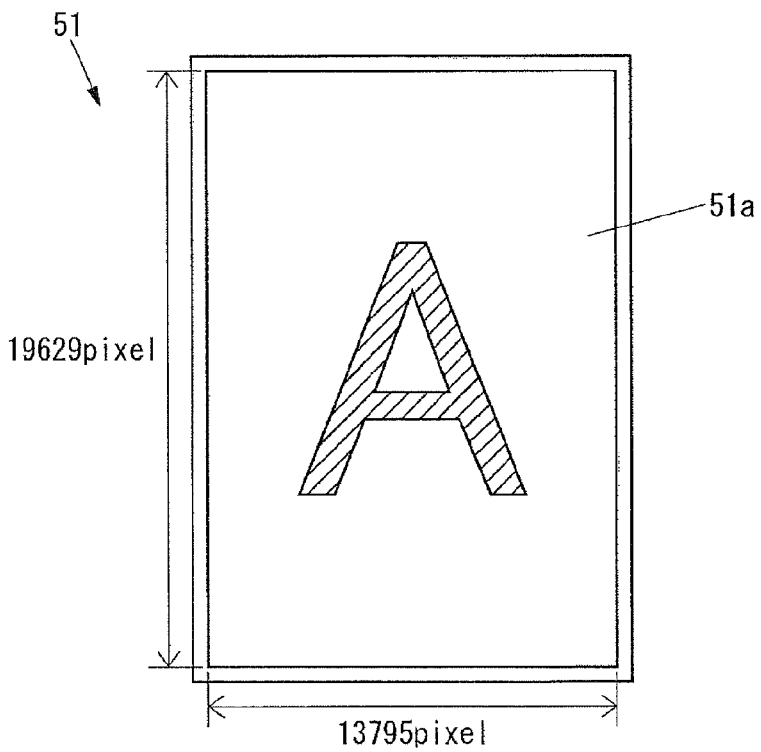
FIG. 8A is a schematic diagram illustrating an example of drawing performed on the basis of an actual print resolution of the MFP by application shown in FIG. 3.
Figure 8B:
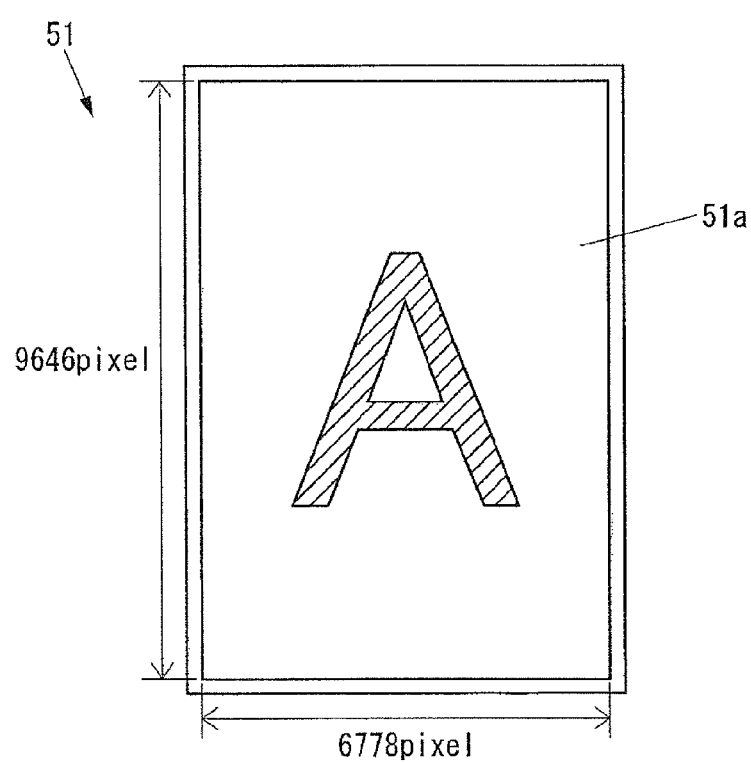
FIG. 8B is a schematic diagram illustrating an example of drawing based on a resolution obtained by multiplying the actual print resolution of the MFP by a specific scale factor performed by the application shown in FIG. 3.
Figure 9:
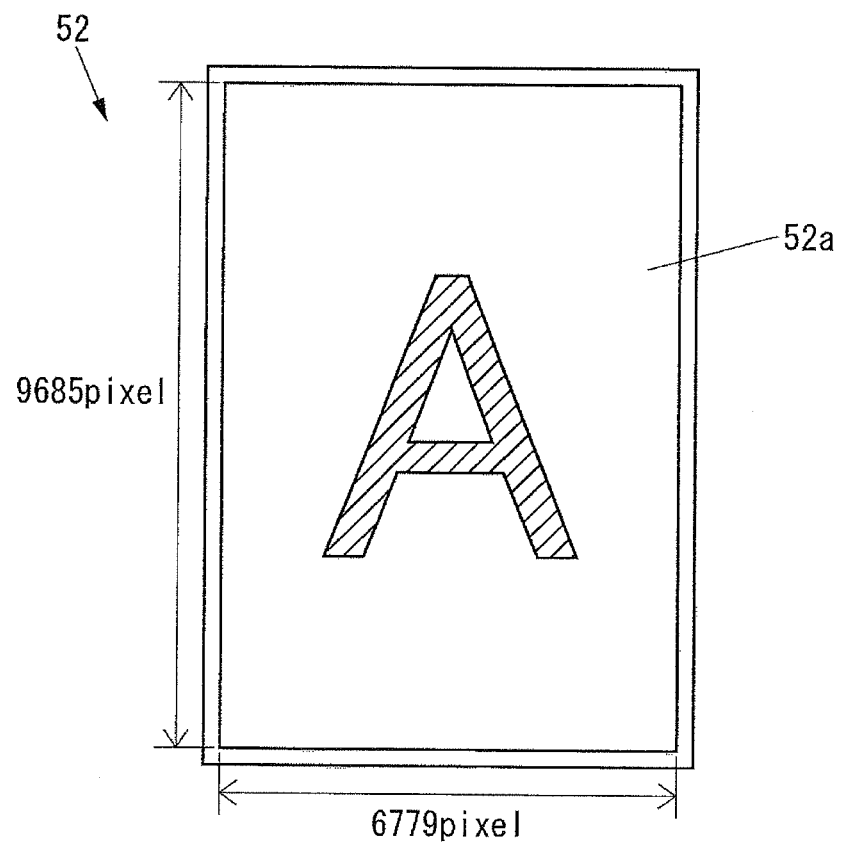
FIG. 9 is a schematic diagram illustrating an example of printing by a printer shown in FIG. 2.

As shown in FIGS. 8A, 8B, and 9, a difference between the number of pixels of the print script generated by the application software 34b and the number of pixels to be printed on the recording medium by the MFP 20 is smaller in the case where the application software 34b generates the print script in accordance with the resolution to reply obtained in S134 than in the case where the application software 34b generates the print script in accordance with the resolution to reply obtained in S132.

For instance, there is described a case where the number of pixels of the print script generated by the application software 34b in accordance with the resolution to reply obtained in S132 is three times the number of pixels to be printed on the recording medium by the MFP 20, and the number of pixels of the print script generated by the application software 34b in accordance with the resolution to reply obtained in S134 is equal to the number of pixels to be printed on the recording medium by the MFP 20.

Figure 12A:
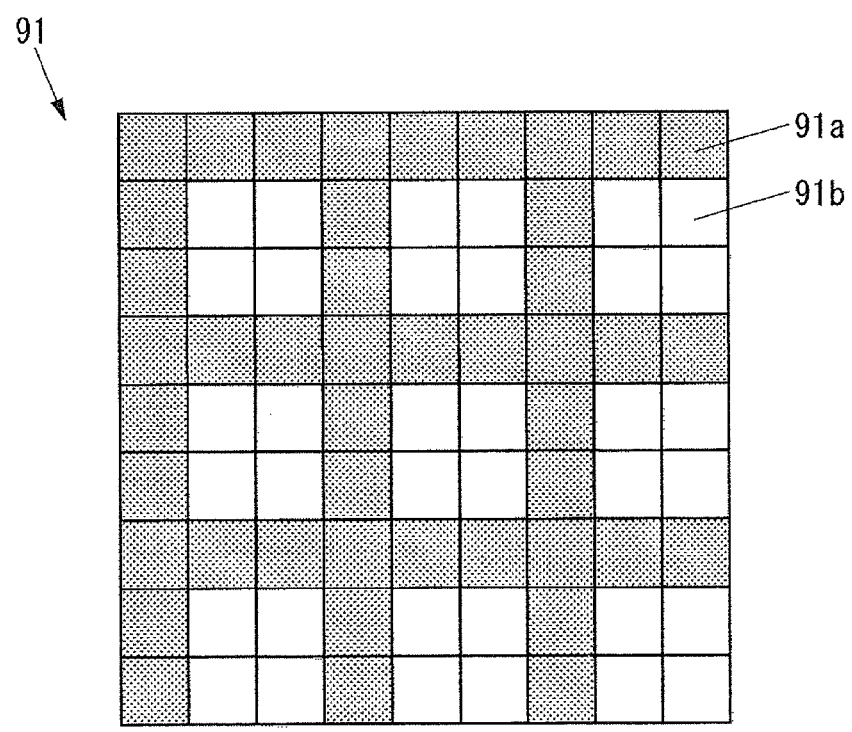
FIG. 12A is a schematic diagram illustrating a partial region of a print script generated from an original by the application in accordance with an actual print resolution of the image forming apparatus by a conventional method.
Figure 12B:
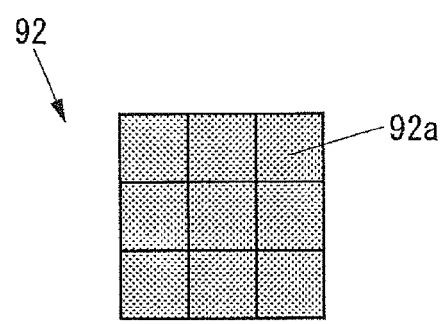
FIG. 12B is a schematic diagram illustrating a region printed by the image forming apparatus corresponding to the region shown in FIG. 12A.

As described above, in the case where the application software 34b generates the print script from the original corresponding to the resolution to reply obtained in S132, when the region of the print script corresponding to the region having a filled pixel ratio of 5/9 in the original is the region 91 shown in FIG. 12A, because the MFP 20 performs 1/3 reduced printing, the region 91 of the print script is printed on the recording medium by the MFP 20 so as to be the region 92 shown in FIG. 12B. In other words, the filled pixel ratio of the original is maintained in the region 91 of the print script but is largely changed in the region 92 printed by the MFP 20.

Figure 10A:
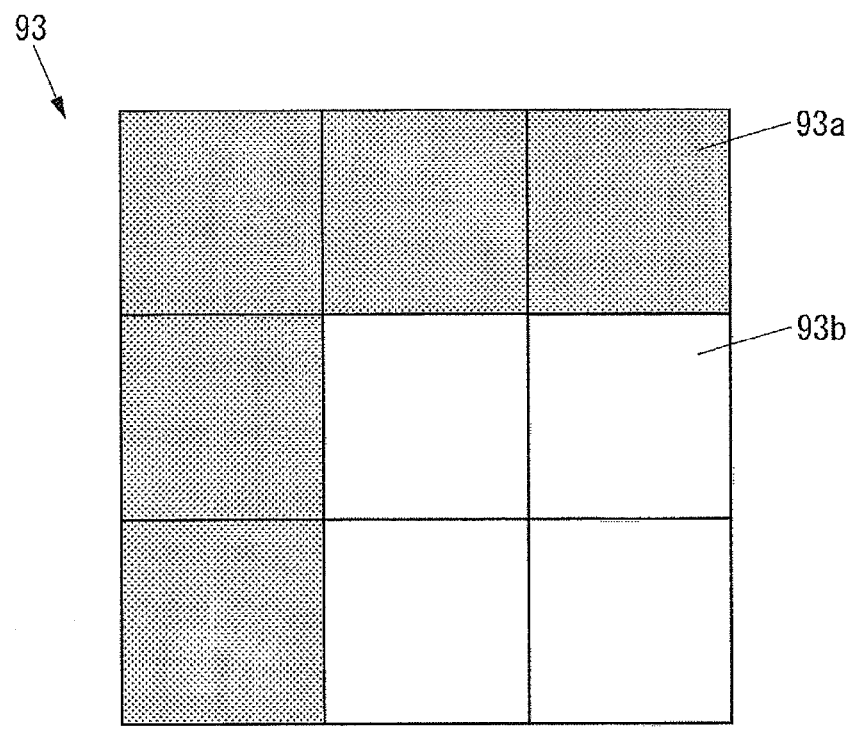
FIG. 10A is a schematic diagram illustrating a partial region of a print script generated from the original on the basis of a resolution obtained by multiplying the actual print resolution of the MFP by a specific scale factor by the application shown in FIG. 3.
Figure 10B:
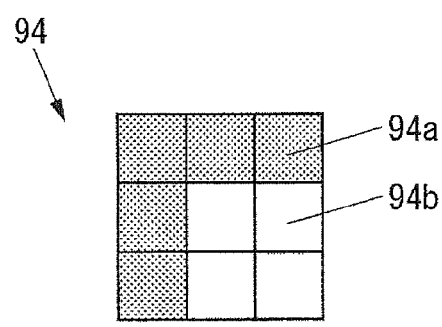
FIG. 10B is a schematic diagram illustrating a region printed by the printer shown in FIG. 2 corresponding to the region shown in FIG. 10A.

On the other hand, in the case where the application software 34b generates the print script from the original in accordance with the resolution to reply obtained in S134, the region of the print script corresponding to the region having a filled pixel ratio of 5/9 in the original is a region 93 shown in FIG. 10A, and the MFP 20 does not perform the reduced printing. Accordingly, the region 93 of the print script is printed on the recording medium by the MFP 20 so as to be a region 94 shown in FIG. 10B. Here, the region 93 shown in FIG. 10A has 3×3 pixels including filled pixels 93a and unfilled pixels 93b. The total number of pixels in the region 93 is 9, and the number of pixels 93a in the region 93 is 5. Accordingly, the filled pixel ratio of the region 93 is 5/9. In the same manner, the region 94 shown in FIG. 10B has 3×3 pixels including filled pixels 94a and unfilled pixels 94b. The total number of pixels in the region 94 is 9, and the number of pixels 94a in the region 94 is 5. Accordingly, the filled pixel ratio of the region 94 is 5/9. In other words, the filled pixel ratio of the original is maintained in the region 93 of the print script as well as in the region 94 printed by the MFP 20.

As described above, the printer driver 34c replies the resolution obtained in S134 by multiplying the actual print resolution of the MFP 20 by the scale factor obtained in S133 based on the output sheet size and the original size to the application software 34b. Accordingly, it is possible to decrease a difference between the number of pixels of the print script generated by the application software 34b and the number of pixels printed on the recording medium by the MFP 20. A small difference between the number of pixels of the print script generated by the application software 34b and the number of pixels printed on the recording medium by the MFP 20 means that execution of a pixel thinning process or a pixel insertion process by the control unit 28 of the MFP 20 is suppressed when the MFP 20 performs printing based on the print script. Accordingly, in a result of printing performed by the MFP 20, it is possible to suppress collapse of detail caused by the pixel thinning or moire caused by regular pixel thinning or regular pixel insertion. Accordingly, the printer driver 34c can improve print quality to be higher than conventional even if the original 51 is extremely reduced for printing.

In addition, when the printer driver 34c replies the resolution obtained in S134 to the application software 34b, because the number of pixels of the print script generated by the application software 34b is reduced, a storage capacity to be used for drawing in a RAM capacity of the computer 30 can be reduced.

Because the printer driver 34c obtains the scale factor on the basis of the printable region, print quality can be further improved. Note that the printer driver 34c does not need to consider the printable region for at least one of the original size and the output sheet size. For instance, the printer driver 34c may obtain the scale factor by dividing the sizes in horizontal and vertical directions of the output sheet size by the sizes in horizontal and vertical directions of the original size, respectively.

The printer driver 34c permits the user to select one of the actual print resolution of the MFP 20 and the resolution obtained by multiplying the actual print resolution of the MFP 20 by the specific scale factor, to be replied to the application software 34b, with the dialog box 40. Accordingly, convenience can be improved.

In the case where the computer 30 includes a printer driver other than the printer driver 34c, the effect described above can be obtained only by replacing the printer driver with the printer driver 34c.

In the example described above, the original is printed in a single recording medium, but the present disclosure can be applied also to a case where the original is printed in a plurality of recording media.

Figure 11:
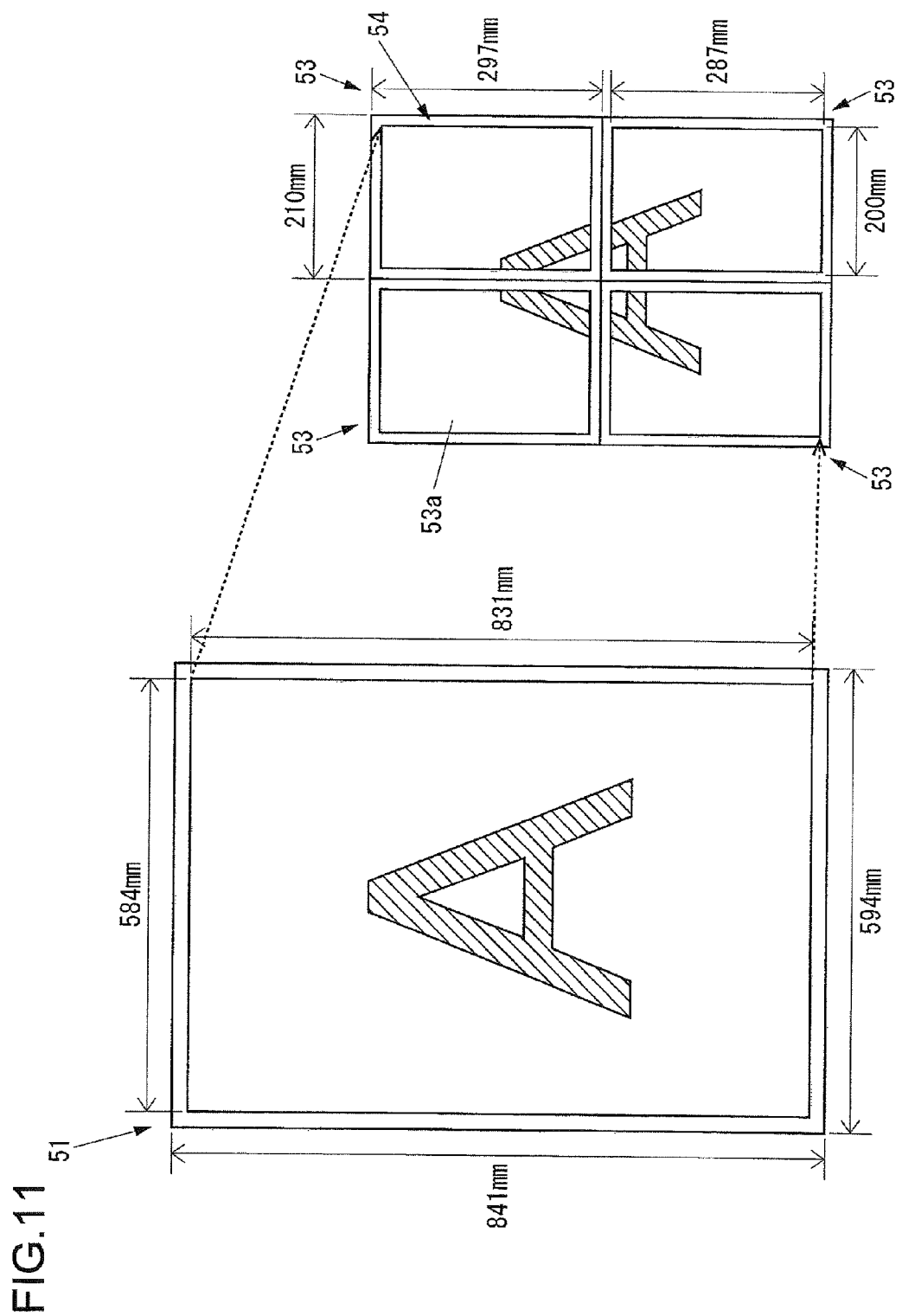
FIG. 11 is a schematic diagram illustrating an example of an original and a plurality of recording media on which an image based on the original is printed by the MFP shown in FIG. 2.

For instance, FIG. 11 shows an example of poster printing in which a plurality of recording media are joined together to form an image.

In the example of FIG. 11, four recording media 53 of A4 size are joined together to secure a printable region 54 that is substantially close to A2 size. In other words, each of the recording media 53 has a size of 210×297 mm, and a printable region 53a thereof has a size of 200×287 mm. Accordingly, the printable region 54 obtained by joining the printable regions 53a of the four recording media 53 together has a size of 400×574 mm. In the case of this example, the horizontal scale factor is 400 mm/584 mm, namely, 68.49%, and the vertical scale factor is 574 mm/831 mm, namely, 69.07%. Accordingly, the scale factor obtained in S133 is 68.49%.

The image forming apparatus of the present disclosure is the MFP in this embodiment, but it may be an image forming apparatus other than the MFP, such as a dedicated printer.

As described above, the print quality can be improved to be better than ever even if the original is extremely reduced for printing, as long as the computer-readable non-transitory storage medium is provided, which stores the printer driver according to the present disclosure.

Accordingly, the print quality can be improved to be better than ever even if the original is extremely reduced for printing, as long as the printing method includes the steps of obtaining the scale factor of the resolution to reply to the actual print resolution of the image forming apparatus on the basis of the size of the recording medium to be printed by the image forming apparatus and the original size, obtaining the resolution to reply by multiplying the obtained scale factor by the actual print resolution of the image forming apparatus, and performing printing on the basis of the resolution to reply.

What is claimed is:

1. A non-transitory computer readable storage medium storing a printer driver to be used by application software for generating a print script to be printed by an image forming apparatus from an original in accordance with ability of the image forming apparatus,
the printer driver causing the computer to function as an ability reply device, wherein the ability device replies the ability to the application software in response to an inquiry asking the ability from the application software, and
wherein the ability reply device obtains a resolution to reply as a print resolution included in the ability to reply to the application software, by obtaining a scale factor of the resolution to reply to an actual print resolution of the image forming apparatus on the basis of a size of a printable region in a size of a recording medium to be printed by the image forming apparatus and a size of a printable region in a size of the original, and by multiplying the obtained scale factor by the actual print resolution of the image forming apparatus,
wherein, the ability reply device determines a horizontal scale factor Rw and a vertical scale factor Rh from the following equation:

$$Rw=(W2-d\times2)/(W1-d\times2), \text{ and } Rh=(H2-d\times2)/(H1-d\times2),$$

when non-printable regions in upper, lower, right, and left sides of the recording medium have the same width, and when supposed that sizes in horizontal and vertical directions of the size of the original are W1 and H1, respectively, sizes in horizontal and vertical directions of the size of the recording medium are W2 and H2, respectively, and a width of the non-printable region of the recording medium is d, and
wherein the ability reply device obtains a smaller one of the determined Rw and Rh as the scale factor of the resolution to reply.

2. The non-transitory storage medium according to claim 1,
the printer driver further causing the computer to function as a setting receiving device that receives a setting whether or not the resolution to reply is the actual print resolution of the image forming apparatus,
wherein the ability reply device further obtains the actual print resolution of the image forming apparatus as the resolution to reply when the setting that the resolution to reply is the actual print resolution of the image forming apparatus is received by the setting receiving device, and
wherein the ability reply device further obtains the resolution to reply by multiplying the actual print resolution of the image forming apparatus by the scale factor when the setting that the resolution to reply is not the actual print resolution of the image forming apparatus is received by the setting receiving device.

3. A printing method by an image forming apparatus and a printer driver included in a computer, a printer driver being used by application software for generating a print script to be printed by the image forming apparatus from an original in accordance with ability of the image forming apparatus, the printing method comprising;
via the computer,
obtaining a scale factor of a resolution to reply to an actual print resolution of the image forming apparatus on the basis of a size of a printable region in a size of a recording medium to be printed by the image forming apparatus and a size of a printable region in a size of an original; and
multiplying the obtained scale factor by the actual print resolution of the image forming apparatus so as to obtain the resolution to reply; and
via the image forming apparatus,
performing printing on the basis of the resolution to reply,
wherein the printing method further comprises:
via the computer,
determining a horizontal scale factor Rw and a vertical scale factor Rh from the following equation:

$$Rw=(W2-d\times2)/(W1-d\times2), \text{ and } Rh=(H2-d\times2)/(H1-d\times2),$$

when non-printable regions in upper, lower, right, and left sides of the recording medium have the same width, and when supposed that sizes in horizontal and vertical directions of the size of the original are W1 and H1, respectively, sizes in horizontal and vertical directions of the size of the recording medium are W2 and H2, respectively, and a width of the non-printable region of the recording medium is d; and
obtaining a smaller one of the determined Rw and Rh as the scale factor of the resolution to reply.

4. The printing method according to claim 3, further comprising:
via the computer,
receiving a setting whether or not the resolution to reply is the actual print resolution of the image forming apparatus;
obtaining the actual print resolution of the image forming apparatus as the resolution to reply when the setting that the resolution to reply is the actual print resolution of the image forming apparatus is received; and
obtaining the resolution to reply by multiplying the actual print resolution of the image forming apparatus by the scale factor when the setting that the resolution to reply is not the actual print resolution of the image forming apparatus is received.

* * * * *